Dec. 6, 1960  G. M. SETZEKORN ET AL  2,963,191
FERMENTATION TANK

Filed Jan. 29, 1958  2 Sheets-Sheet 1

INVENTORS
Gene M. Setzekorn
William A. Taylor
John W. Maybaum
by Ooms, McDougall, Williams & Hersh
Attorneys Dec. 6, 1960   G. M. SETZEKORN ET AL   2,963,191
FERMENTATION TANK
Filed Jan. 29, 1958   2 Sheets-Sheet 2

INVENTORS
Gene M. Setzekorn
William A. Taylor
John W. Mayboum
Ooms, McDougall, Williams & Hersh
Attorneys

United States Patent Office 2,963,191
Patented Dec. 6, 1960

2,963,191

FERMENTATION TANK

Gene M. Setzekorn, Elmhurst, William A. Taylor, Midlothian, and John W. Maybaum, Chicago, Ill., assignors to U.S. Industries, Inc., New York, N.Y., a corporation of Delaware Filed Jan. 29, 1958, Ser. No. 711,958

7 Claims. (Cl. 220—1)

This invention relates to a fermentation tank and more particularly to a fermentation tank which is shaped to withstand high internal pressures.

Tanks used in the fermentation stage of beer or for the production of other bacteriological products are frequently pressurized to hasten the fermentation process. This pressure imposes severe design restrictions on the tank. If pressure considerations alone are considered, it would be best for the tanks to have a spherical shape, but tanks having such shapes are expensive to fabricate and they do not economically utilize the available space in the manufacturing plant. For economy in manufacture and for the most efficient utilization of plant space, rectangular tanks would be best, but they do not withstand high internal pressures very well, and to strengthen them so that they do, would be very costly. For this reason commercially acceptable fermentation tanks have to be a compromise between optimum strength and an acceptable cost.

In addition to these general considerations, fermentation tanks must have a flat bottom or base to permit the valuable bacteriological residues to be deposited thereon. For example, when a fermentation tank is used for the production of beer, the yeast is deposited on the flat base in three distinct and economically useful layers. The bottom layer is composed of dead yeast which is used in connection with cattle feed. The intermediate layer of yeast is partially alive, and this is suitable for human use. The upper layer is completely alive and this may be re-used for the further production of beer. When the beer is fermented and drained out of the tank the yeast residues on the flat bottom of the tank must be carefully collected in their separate layers and sold. Without such a flat base, these layers of yeast would become mixed and a large proportion of their economic value would be lost.

Another important restriction in the design of fermentation tanks is the desirability to maintain the interior surfaces of the tank free of corners or obstructions where impurities can lodge since such impurities will interfere with the fermentation process. When supports or other structures are present in the tank, the cleaning operation to remove impurities becomes quite difficult and almost impossible. Thus the cleaning time and cost would be multiplied by a considerable factor, and there would still be a danger that impurities would remain. These dangers can be largely eliminated by keeping the interior of the tank clear of obstructions or sharp corners in which dirt or foreign organisms can hide and grow. Any impurities present in the tank might have very severe consequences. For example, in the production of beer, the flavor of the resulting product is determined by the particular strain of yeast used in its manufacture. This strain is kept very pure and is carefully isolated from contamination with unknown or wild yeast strains. If impurities were left in the tank, they might attract a strain of wild yeast which could grow and completely alter the flavor of the resulting product.

Another factor entering into the design of fermentation tanks is the requirement that the conventional relationship between the volume of the liquid in the tank and the volume of the vapor space above the tank be maintained. The basis of these relationships is traditional practice, but it is none the less binding in the design of these tanks. In this connection, for example, it is necessary that the tank be dimensioned so that the liquid inside will rise to a height of 8'3" above the base of the tank, which custom has determined to be the most suitable for cleaning purposes.

What is needed, therefore, and comprises the principal object of this invention is a fermentation tank shaped to withstand high internal pressure without internal reinforcements, and which efficiently utilizes the available space in the plant.

A further object of this invention is to produce a fermentation tank having a flat bottom and a smooth unsupported inner surface.

Another object of this invention is to produce a fermentation tank having a flat bottom with no internal stiffeners or sharp corners on its inner surfaces, and which conforms to the customary relationship between the volume of the liquid and the volume of the vapor space above the liquid, traditional in the prior fermentation tanks.

Still another object of this invention is to produce a fermentation tank having end portions which can be fabricated separately to permit tanks of various lengths to be readily constructed.

Yet a further object of this invention is to produce a fermentation tank with walls having bottom portions with a large radius of curvature, which merge tangentially into an upper portion having a small radius of curvature, so that the fermentation tank can withstand high fermentation pressures without the necessity for internal reinforcements.

Another object of this invention is to produce a fermentation tank which can be easily and economically formed from a plurality of plate sections secured together.

These and other objects of this invention will become more apparent when read in the light of the accompanying drawings and specifications wherein—

Figure 1:
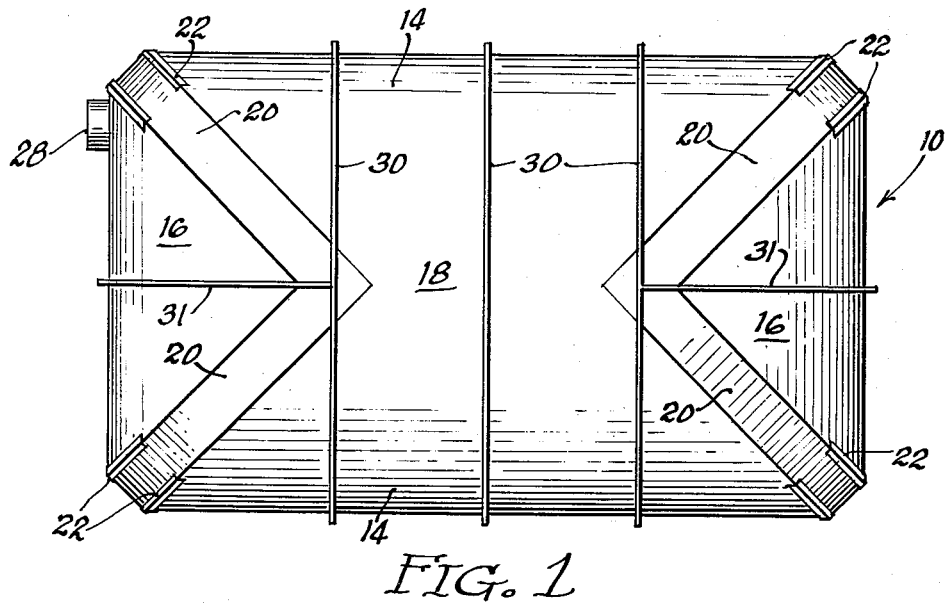
Figure 1 is a plan view of the fermentation tank constructed according to this invention.
Figure 2:
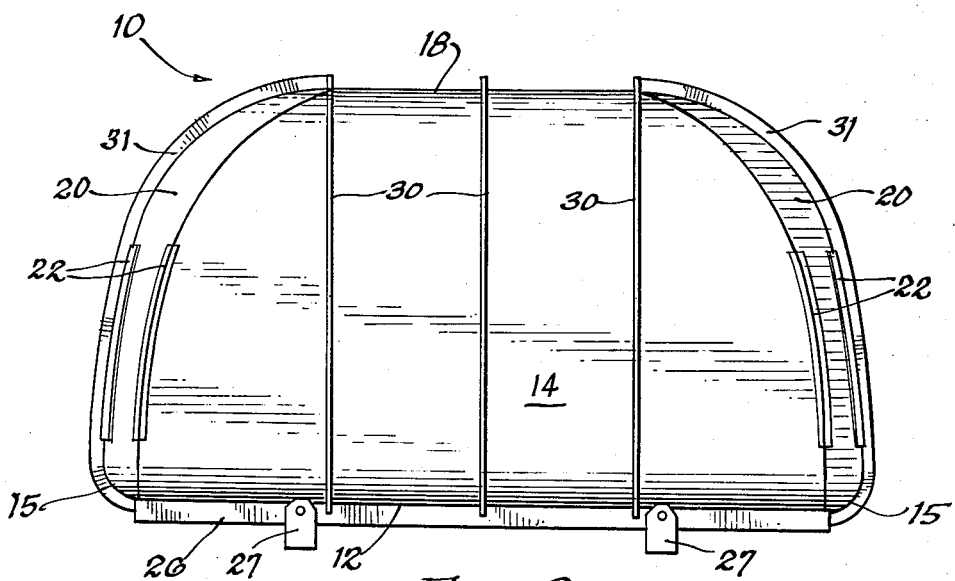
Figure 2 is a side elevational view of the fermentation tank shown in Figure 1.

Referring now to the drawings, the fermentation tank, indicated generally by the reference numeral 10, comprises a planar base 12 with side and end walls 14 and 16. These side and end walls may be formed from an integral sheet of metal, usually some form of stainless steel, or they may be formed from smaller plate sections which are secured together by welding or other conventional means. As seen in Figures 2 and 4, the side and end walls 14 and 16 have the same inwardly projecting curve with upper and lower portions. The base 15 of the lower portions is arcuately curved and is connected to the periphery of the planar base 12, with the walls 14 and 16 projecting upwardly therefrom so that the union between said side and end walls with said planar base does not form a sharp corner on the inner surfaces of the tank. The lower portions of the walls, see Figures 3 and 4, have a large radius of curvature and they merge tangentially with the upper portions having a small radius of curvature. As a practical illustration of the magnitude of these dimensions, if the fermentation tank is to have a capacity of about 550 barrels, with a base approximately 20 feet by 12 feet and a height of about 12 feet, then the radius of curvature of the lower portions of the walls would be around 20 feet, and the radius of curvature of the upper portions would be about 5½ feet. The upper portions 17 of the side walls continuously curve until they meet and form the substantially horizontal upper wall 18, see Figure 1. It is noted that the ends of the side walls 14 converge toward the upper wall 18 for reasons to be described below. As seen in the drawings, the side and end walls are inwardly curved or, in other words, their inner surfaces are concave, but under some circumstances they could be outwardly curved, or the lower portion could be inwardly curved and the upper portion could be outwardly curved, etc. The fermentation tank constructed in accordance with the above described dimensions conforms to the conventional relationships between volume and vapor space. This means, for example, that the fermentation tank will have the same number of barrels of liquid below the standardized 8'3" liquid level as the prior fermentation tanks.

Figure 6:
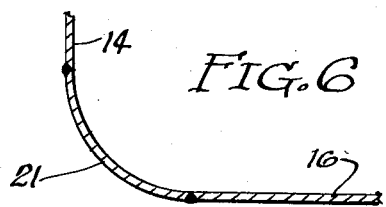
Figure 6 is a sectional view of the fermentation tank similar to Figure 5 showing a modified form of the connecting strips adapted for use in the tank.

The end walls 16 have to be rigidly connected to the side and upper walls 14 and 18 in order for the tank to be completely pressure sealed. In addition, there is the hygenic requirement that the inner surfaces of the tank be completely free of internal reinforcements or sharp dirt-collecting grooves which may form at the intersection of the side and end walls. Since at any distance above the base 12, planes tangent to the sides and end walls are perpendicular to each other, a pair of flat band-like connecting strips 20 are necessary to join the side and end walls together to avoid a 90° corner on the inner surfaces of the tank which would otherwise be formed by a direct connection between the side and end walls. These connecting strips 20 have the same curvature in their longitudinal direction as the oblique intersection between the adjacent edges of the side and end walls 14 and 16. With this arrangement, it is clear that the intersection of the side and end walls 14 and 16 with the connecting strips in the inner surfaces of the tank, would be at a very oblique angle or non-sharp corner so that the interior of the tank, and more particularly the intersection of the connecting strips and the adjacent side and end walls, can be easily cleaned. Connecting strips 20 are a departure from the more ideal connecting strip 21, which as seen in Figure 6 is arcuate in cross section. This connecting strip would be better because it is stronger and more pressure resistant than connecting strip 20, but it is much more difficult and expensive to fabricate.

Each connecting strip has straight parallel edges. The edges of end walls 16 are rigidly connected to one edge of each of the connecting strips 20 by welding, or other conventional means, and the opposite edge of each connecting strip is similarly connected to the converging edges of the side and upper walls 16 and 18. As seen in Figure 1, the edges of the end walls 16 converge and taper to a point at their upper portion, presenting a substantially triangular appearance in plan view. For this reason, the connecting strips have the appearance of a carpenter's square, in Figure 1. With this arrangement, the end walls and connecting strips can be fabricated separately and stored, so that tanks of various lengths but with this common cross-sectional shape can be quickly constructed. It is apparent, also, that when cost is no object, the fermentation tanks would be constructed using the arcuate connecting strips 21 instead of connecting strips 20.

Figure 5:
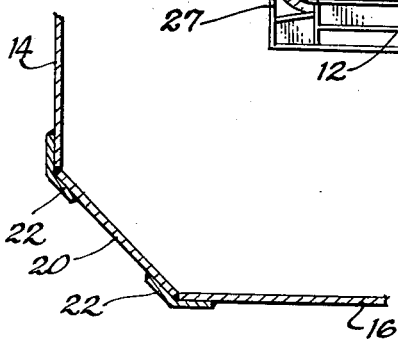
Figure 5 is a sectional view of the fermentation tank taken on the line 5—5 of Figure 4.

As stated above, when the connecting strips shown in Figure 5 are used, the fermentation tank will be less expensive to make, but because the connecting strips are a compromise in the interest of economy they will be less able to withstand high internal pressures inside the tank. To compensate for this weakness, inexpensive reinforcing strips 22 may be used where the internal pressure inside the tank requires it. These reinforcing strips are rigidly secured to and coextensive with at least a portion of the external surfaces of the connection between the side and the end walls, and the connecting strips 20, see Figures 2 and 5.

Figure 3:
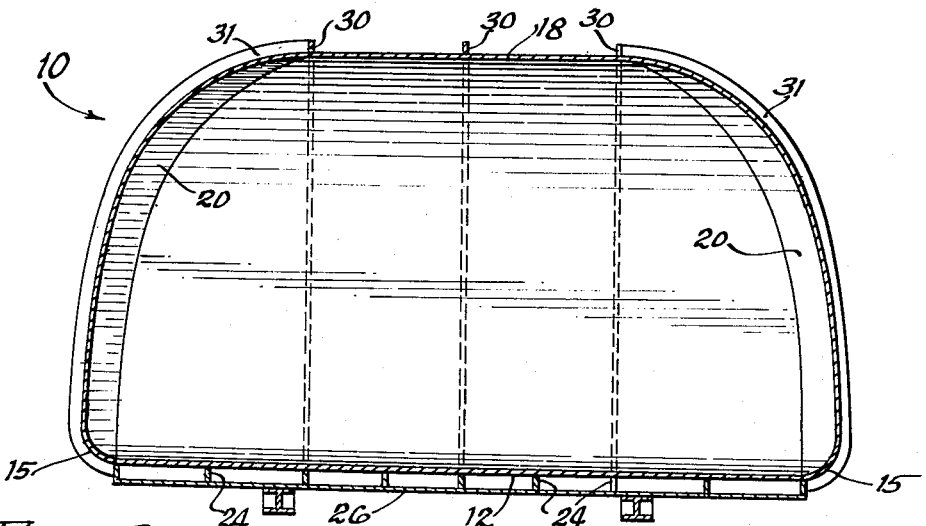
Figure 3 is a side sectional view of the fermentation tank.
Figure 4:
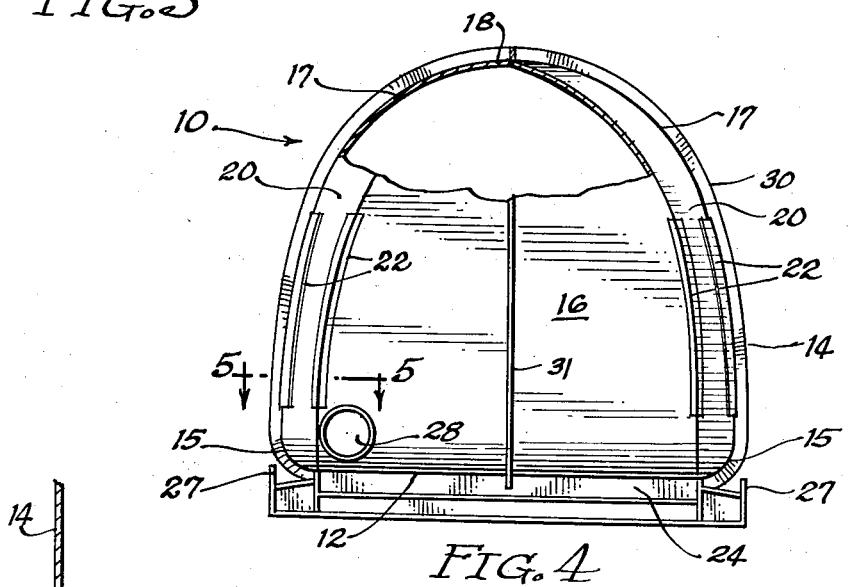
Figure 4 is an end elevational view of the fermentation tank with a portion broken away.

Supporting beams 24 are mounted underneath the base surface 12 to prevent the base from being deformed under the weight and pressure of the material inside the tank, see Figure 3. It is very important that the base of this fermentation tank be distortion free because the volume of the fermenting liquid inside the tank is rather critical, and any distortion in the tank base would change the liquid capacity of the tank and would produce errors in the measurements of the liquid therein. These supporting beams 24 may be covered by a smooth shell 26, see Figure 2, to prevent dirt or foreign organisms from accumulating in that area. To further prevent contamination from this area, and to make it easier to clean, hook members 27 are rigidly secured to the supporting beams 24 by any conventional means (not shown) so that the entire tank may be suspended from a beam at a distance of about a foot or more above the floor. Entrance to the interior of the tank for the purpose of cleaning may be had through a conventional normally sealed manhole 28. In this way the interior of the tank can be thoroughly cleaned after the fermented product has been drained from the tank by conventional drainage pipes (not shown).

The fermentation tank described to this point is designed to produce a high degree of strength for the material used, and it can withstand high internal pressures and the weight of a considerable volume of fermenting liquid, without deformation. In addition, its shape is such as to permit an efficient utilization of plant space. Nevertheless, this tank is still a departure from the ideal spherical shape which is best able to withstand high internal pressures. It would be possible to compensate for this by making the side and end walls of the tank from a thicker gauge metal, but this would be very costly and could make the fermentation tank economically prohibitive. To avoid this, side and end wall stiffening members 30 and 31 may be provided. These stiffening members are formed from a thin plate material such as stainless steel, and are disposed in a vertical plane, with one edge engaging the outer surface of the walls of the tank. With this arrangement the grooves formed between the stiffening members and the walls of the tank, extend in a vertical direction, and this minimizes the tendency for dirt or other impurities to collect there. As seen in Figures 2 and 3, the stiffening members include three U-shaped stiffeners 30 which are disposed in spaced parallel relationship to each other along the length of the tank. These stiffeners are rigidly secured to the side and upper walls 14 and 18 by any conventional means (not shown). The end walls 14 are supported by the stiffeners 31, see Figure 2, which are similarly secured thereto. These stiffeners are in a plane transverse to the planes of the stiffeners 30, and their inner edge conforms to the curvature of the outer surfaces of these end walls. The top edges of stiffeners 31 are rigidly secured to the top portion of the side wall stiffeners 30 by any conventional means. In this way, the strains on some of the stiffeners due to high pressure inside the tank are distributed among all the stiffeners to better enable the tank to withstand the high internal pressures.

It is understood that this fermentation tank is adapted to include the conventional temperature control coils and the liquid supply and drainage pipes (not shown) which would be connected to the fermentation tank in the usual way.

The invention may be embodied in other forms without departing from the spirt or essential characteristics thereof as set forth in the claims, and the present embodiment is therefore to be considered as illustrative and not restrictive, and it is intended to include all changes which come within the scope and range of the claims.

We claim:

1. A fermentation tank with a substantially constant shape and having a planar base, upwardly projecting side and end walls connected to the periphery of said planar base, each of said side and end walls having a lower portion, said lower portion having a large radius of curvature, and merging tangentially to an upper portion having a small radius of curvature, said upper portions of said side walls continuously curving to meet and form an integral horizontally extending upper wall, connecting strips formed from a strong substantially rigid material for connecting said end walls to said side and upper walls, the edges of said end walls integrally attached to one edge of said connecting strips, the opposite edge of said connecting strips integrally attached to the edges of said side and upper walls of said fermentation tank to seal it, said connecting strips shaped so that the union between said side and end walls and said connecting strips does not form sharp corners inside said fermentation tank.

2. A fermentation tank free of internal reinforcements and designed to be normally partially filled with the liquid being fermented with a constant ratio between the volume of liquid in the tank and the volume of vapor space above the liquid in the tank, said fermentation tank having a planar base, upwardly projecting side and end walls having the same inward curve connected to the periphery of said planar base, each of said side and end walls having a lower portion, said lower portion having a large radius of curvature, the upper part of said lower portion merging tangentially with an upper portion having a small radius of curvature, said upper portions of said side walls continuously curving to meet and form a substantially horizontal upper wall, connecting strips formed from a strong comparatively rigid material for connecting said end walls to said side and upper walls, the edges of said end walls integrally attached to one edge of said connecting strips, the opposite edges of said connecting strips integrally attached to the edges of said side and upper walls of said fermentation tank to seal it, said connecting strips shaped so that the union between said side and end walls and said connecting strips does not form sharp corners inside said fermentation tank.

3. A fermentation tank free of internal reinforcements, designed to be normally partially filled with the liquid being fermented and with a constant shape so that the ratio between the volume of liquid in the tank and the volume of vapor space above the liquid in the tank is constant, said fermentation tank having a planar base, stiffening means connected to the external portions of said planar base to prevent deformation due to the weight of the material in the tank, side and end walls adapted to be formed from plate sections secured together, said side and end walls having the same inward curve and connected at one end to the periphery of said planar base projecting upwardly therefrom, each of said side and end walls having a lower portion, said lower portion having a large radius of curvature, the upper part of said lower portion merging tangentially with an upper portion having a small radius of curvature, said upper portions of said side walls continuously curving to meet and form a substantially horizontal upper wall, connecting strips having an infinite radius of curvature in cross section and formed from a strong comparatively rigid material for connecting said end walls to said side and upper walls, the edge of said end walls integrally attached to one edge of said connecting strips, the opposite edge of said connecting strips integrally attached to the edges of said side and upper walls of said fermentation tank to seal it, said connecting strips having the same longitudinal curve as the oblique intersection between the adjacent edges of the side and end walls and having a curvature in cross section such that the union between said side and end walls with said connecting strips does not form sharp corners inside said fermentation tank.

4. A fermentation tank designed to be normally partially filled with the liquid being fermented and having a constant shape so that the ratio between the volume of liquid in the tank and the volume of vapor space above the liquid in the tank is constant, said fermentation tank having a planar base, stiffening means connected to the external portion of said planar base to prevent deformation due to the weight and pressure of the material inside the tank, upwardly projecting side and end walls adapted to be formed from plate sections secured together, said side and end walls having the same inward curve and including upper and lower portions, said lower portions having a large radius of curvature and said upper portions having a small radius of curvature, the base of said lower portions arcuately curved and connected to the periphery of said planar base so that the union between said side and end walls with said planar base does not form sharp corners on the inner surfaces of the tank, the upper part of said lower portions of said side and end walls merging tangentially with said upper portions, the upper portions of said side walls continuously curving to meet and form an integral substantially horizontal upper wall, connecting strips having an infinite radius of curvature in cross section and formed from a strong comparatively rigid material for connecting said end walls to said side and upper walls, the edge of said end walls integrally attached to one edge of said connecting strips, the opposite edge of said connecting strips integrally attached to the edges of said side and upper walls of said fermentation tank to seal it, said connecting strips having the same longitudinal curve as the oblique intersection between the adjacent edges of the side and end walls, and having a curvature in cross section such that the union between said side and end walls with said connecting strips does not form sharp corners inside said fermentation tank.

5. A fermentation tank designed to be normally partially filled with the liquid being fermented and having a constant shape so that the ratio between the volume of liquid in the tank and the volume of vapor space above the liquid in the tank is constant, said fermentation tank having a planar base, stiffening means connected to the external portion of said planar base to prevent deformation due to the weight and pressure of the material inside the tank, said stiffening means adapted to be enclosed in a smooth shell to prevent the accumulation of dirt thereon, upwardly projecting side and end walls adapted to be formed from plate sections secured together, said side and end walls having the same inward curve and including upper and lower portions, said lower portions having a large radius of curvature and said upper portions having a small radius of curvature, the base of said lower portions arcuately curved and connected to the periphery of said planar base so that the union between said side and end walls with said planar base does not form sharp corners on the inner surfaces of the tank, the upper part of said lower portions of said side and end walls merging tangentially with said upper portions, the upper portions of said side walls continuously curving to meet and form an integral substantially horizontal upper wall, connecting strips having an infinite radius of curvature in cross section and formed from a strong comparatively rigid material for connecting said end walls to said side and upper walls, the edge of said end walls integrally attached to one edge of said connecting strips, the opposite edge of said connecting strips integrally attached to the edges of said side and upper walls of said fermentation tank to seal it, said connecting strips having the same longitudinal curve as the oblique intersection between the adjacent edges of the side and end walls, and having a curvature in cross section such that the union between said side and end walls with said connecting strips does not form sharp corners inside said fermentation tank.

6. A fermentation tank free of internal reinforcements, designed to be normally partially filled with the liquid being fermented and having a constant shape so that the ratio between the volume of liquid in the tank and the volume of vapor space above the liquid in the tank is constant, said fermentation tank having a planar base, stiffening means connected to the external portion of said planar base to prevent deformation of the base due to the weight and pressure of the material inside the tank, a smooth shell connected to the external portion of the base of said fermentation tank, said smooth shell enclosing said stiffening means to prevent the accumulation of dirt thereon, upwardly projecting side and end walls adapted to be formed from plate sections secured together, said side and end walls having the same inward curve and including upper and lower portions, said lower portions having a large radius of curvature and said upper portions having a small radius of curvature, the base of said lower portions arcuately curved and connected to the periphery of said planar base so that the union between said side and end walls with said planar base does not form sharp corners on the inner surfaces of the tank, the upper part of said lower portions of said side and end walls merging tangentially with said upper portions, the upper portions of said side walls continuously curving to meet and form an integral substantially horizontal upper wall, connecting strips having an infinite radius of curvature in cross section and formed from a strong comparatively rigid material for connecting said end walls to said side and upper walls, said connecting strips having parallel edges, the edges of said end walls integrally attached to one of the edges of said connecting strips, the opposite edge of said connecting strips integrally connected to the edges of said side and upper walls of said fermentation tank to pressure seal it, said connecting strips having the same curve in the longitudinal direction as the oblique intersection between the adjacent edges of the side and end walls, and having a curvature in cross section such that the union between said end and side walls with said connecting strips does not form sharp corners inside said fermentation tank, reinforcing strips rigidly secured to and co-extensive with at least a portion of the connection between said connecting strips and said external surfaces of said side and end walls, and side and end wall stiffening members, said stiffening members disposed in a vertical plane, at least one stiffening member embracing the sides and upper wall of said fermentation tank, at least one stiffening member embracing the end and top walls of said fermentation tank whereby the fermentation tank can withstand high internal pressures.

7. The apparatus set forth in claim 6 wherein said side wall stiffening members are disposed in spaced parallel relationship to each other and embrace the side and upper walls of said fermentation tank, one of said end wall stiffening members in supporting engagement with each end wall on said fermentation tank and in a plane perpendicular to said side wall stiffening members, one end of each of said end wall stiffening members rigidly secured to the top portion of one of the side wall stiffening members whereby the strains on some of the stiffening members due to high pressure inside the fermentation tank are distributed among the other stiffening members to better enable the fermentation tank to withstand high internal pressure.

References Cited in the file of this patent

UNITED STATES PATENTS

| | | |
|---|---|---|
| 2,119,518 | Boardman | June 7, 1938 |
| 2,477,831 | Schmitz | Aug. 2, 1949 |
| 2,675,940 | Schmitz | Apr. 20, 1954 |

FOREIGN PATENTS

| | | |
|---|---|---|
| 729,166 | Great Britain | May 4, 1955 |